United States Patent
Mori

(10) Patent No.: US 8,393,672 B2
(45) Date of Patent: Mar. 12, 2013

(54) STRUCTURAL MEMBER

(75) Inventor: Takeo Mori, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 330 days.

(21) Appl. No.: 12/598,553

(22) PCT Filed: May 9, 2008

(86) PCT No.: PCT/IB2008/002027
§ 371 (c)(1),
(2), (4) Date: Nov. 2, 2009

(87) PCT Pub. No.: WO2008/139329
PCT Pub. Date: Nov. 20, 2008

(65) Prior Publication Data
US 2010/0133877 A1    Jun. 3, 2010

(30) Foreign Application Priority Data
May 10, 2007   (JP) .................. 2007-126038

(51) Int. Cl.
*B62D 25/04* (2006.01)
(52) U.S. Cl. .......... 296/193.06; 296/193.05; 296/187.12
(58) Field of Classification Search ............. 296/193.06, 296/193.05, 187.12
See application file for complete search history.

(56) References Cited

U.S. PATENT DOCUMENTS

| 5,246,264 A | 9/1993 | Yoshii |
| 6,702,368 B1 * | 3/2004 | Hanyu ................ 296/193.06 |
| 7,510,234 B2 * | 3/2009 | Ameloot et al. ......... 296/187.12 |
| 2003/0184126 A1 | 10/2003 | Yamazaki et al. |
| 2006/0208537 A1 | 9/2006 | Dingman et al. |

FOREIGN PATENT DOCUMENTS

| DE | 100 28 716 A1 | 6/2001 |
| EP | 0 856 455 | 8/1998 |
| JP | 62-56817 B | 11/1987 |
| JP | 04-365675 A | 12/1992 |
| JP | 10-258768 A | 9/1998 |
| JP | 10-310082 A | 11/1998 |
| JP | 11-129368 A | 5/1999 |
| JP | 2003-231483 A | 8/2003 |
| JP | 2004-306896 A | 11/2004 |
| JP | 2004-314845 A | 11/2004 |
| JP | 2005-206061 A | 8/2005 |
| JP | 2005-343329 A | 12/2005 |
| JP | 2006-062460 A | 3/2006 |

OTHER PUBLICATIONS

Office Action issued Aug. 28, 2011 in JP 2009-271764 and English translation thereof.

* cited by examiner

*Primary Examiner* — Joseph Pape
(74) *Attorney, Agent, or Firm* — Kenyon & Kenyon LLP

(57) ABSTRACT

A structural member includes: a compression-side wall part disposed in a compressive stress field of a bend; a tension-side wall part disposed in a tensile stress field of the bend; and a coupling wall part that couples the compression-side wall part and the tension-side wall part. The neutral axis of the bend is disposed in the vicinity of the compression-side wall part. For example, the compression-side wall part is higher in material strength, and/or larger in sheet thickness, than the tension-side wall part.

2 Claims, 6 Drawing Sheets

STRUCTURAL MEMBER

This is a 371 national phase application PCT/IB2008/002027 filed 9 May 2008, claiming priority to Japanese Patent Application No. 2007-126038 filed 10 May 2007, the contents of which are incorporated herein by reference.

FIELD OF THE INVENTION

The present invention relates to a structural member for application to a framework member for a vehicle or the like.

BACKGROUND OF THE INVENTION

When a framework member for a vehicle receives a load due to a collision or the like, it is elastically budded by a compressive stress locally on the compression side of a bend, since it is weaker on the compression side than on the tension side. Therefore, some framework members for vehicles are formed to have a closed cross sectional structure in which a reinforcement member is disposed only on the compression side of a bend (see Japanese Patent Application Publication No. 2003-731483 (JP-A-2003-231483)). FIG. 5 shows a B-pillar 100 as an example of such framework members. The B-pillar 100 is made up of a pillar outer panel 101 and a pillar inner panel 102 defining a closed cross section, an outer reinforcement 103 and a hinge reinforcement 104 disposed on the compression side of a bend as reinforcing members, and a reinforcement 105 disposed at the middle as a reinforcing member.

In the framework member for a vehicle shown in FIG. 5, the neutral axis of a bend between the compression side and the tension side is positioned in the vicinity of the center of the closed cross section (see the neutral axis A of FIG. 5). Therefore, a compressive stress field extends over a large region in a vertical wall part coupling the compression-side surface and the tension-side surface, and thus a compressive stress acts on the vertical wall part besides the compression-side surface. As a result, the compression side of the framework member is subjected to elastic buckling due to the compressive stress, which progresses locally. In the B-pillar 100 shown in FIG. 5, a local dent H is formed in an outer surface 101a of the pillar outer panel 101 at the moment when such buckling starts.

In order to prevent such elastic buckling due to a compressive stress, it is necessary to improve the stiffness (rigidity) of the compression side. For that purpose, conventional framework members for vehicles are provided with a number of reinforcing members for the compression-side surface and the vertical wall part. As a result, the mass and the cost are unfavorably increased.

DISCLOSURE OF THE INVENTION

The present invention provides a framework member that can achieve high strength and lightweight.

A first aspect of the present invention provides a structural member including: a compression-side wall part disposed in a compressive stress field of a bend; a tension-side wall part disposed in a tensile stress field of the bend; and a coupling wall part that couples the compression-side wall part and the tension-side wall part, in which a neutral axis of the bend of the structural member is disposed in vicinity of the compression-side wall part or disposed at the position of the compression-side wall part.

This structural member includes a compression-side wall part that receives a compressive stress when the structural member is bent by receiving a load, a tension-side wall part that receives a tensile stress when the structural member is bent by receiving a load, and a coupling wall part that couples the compression-side wall part and the tension-side wall part. In this structure, the neutral axis between the compression side (contraction side) and the tension side (elongation side) of a bend is disposed in the vicinity of the compression-side wall part or disposed at the position of the compression-side wall part. Since the compressive stress field and the tensile stress field are respectively smaller and larger as the neutral axis is closer to the compression-side wall part, it is possible to reduce or eliminate the occurrence of elastic buckling due to a compressive stress. As a result, a load of up to the potential strength limit of the material can be endured on the compression side, thereby fully demonstrating the potential strength of the material. Further, since the load to be carried on the tension side can also be increased along with the improvement in proof stress on the compression side, a stress of up to the material strength limit can be produced over the entire cross section, thereby efficiently utilizing the material strength over the entire cross section. In addition, since no or almost no portion of the coupling wall part is to be in the compressive stress field, reinforcing members may be reduced in number or omitted, thereby reducing the weight and the cost. As described above, a high-strength and lightweight (low-cost) structural member can be achieved in which the neutral axis of a bend is disposed in the vicinity of the compression-side wall part.

In the structural member in accordance with the present invention, the compression-side wall part may be higher in material strength than the tension-side wall part. In this structural member, the neutral axis of a bend can be disposed in the vicinity of the compression-side wall part by increasing the material strength of the compression-side wall part compared to that of the tension-side wall part. This is because since the neutral axis is at the position where the compression-side moment (compressive stress) and the tension-side moment (tensile stress) match each other, increasing the strength (rigidity) of the compression-side wall part by increasing the material strength can accordingly reduce the distance from the neutral axis to the compression-side wall part. In addition, increasing the strength of the compression-side wall part itself can also accordingly increase the buckling strength of the compression-side wall part, thereby reducing the occurrence of elastic buckling.

In the structural member in accordance with the present invention, the compression-side wall part is preferably larger in sheet thickness than the tension-side wall part. In this structural member, the neutral axis of a bend can be disposed in the vicinity of the compression-side wall part by increasing the sheet thickness of the compression-side wall part compared to that of the tension-side wall part. In the same way as described above, increasing the strength of the compression-side wall part by increasing the sheet thickness can reduce the distance from the neutral axis to the compression-side wall part, and can increase the buckling strength of the compression-side wall part.

The present invention can provide a high-strength and lightweight structural member in which the neutral axis of a bend is disposed in the vicinity of the compression-side wall part.

A second aspect of the present invention provides a structural member including: a first wall part; a second wall part; and a third wall part that couples the first wall part and the second wall part, in which stiffness (rigidities) of the first to third wall parts are set such that a neutral axis of a bend of the structural member is in vicinity of the first wall part or disposed at the position of the first wall part.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

In embodiments, a framework member in accordance with the present invention is applied to a B-pillar, which is a framework member for a vehicle disposed between a front door and a rear door to support a roof and increase the stiffness (rigidity) of a vehicle body. In the B-pillar in accordance with the embodiments, a pillar outer panel and a pillar inner panel define a closed cross section, and a wall on the compression side of a bend (sidewall on the outer side) of the closed cross section is configured to have high strength and a large sheet thickness. In a first embodiment, of the two embodiments, reinforcing members are provided to achieve high strength and a large sheet thickness. In a second embodiment, the pillar outer panel is configured to achieve high strength and a large sheet thickness.

Figure 1:
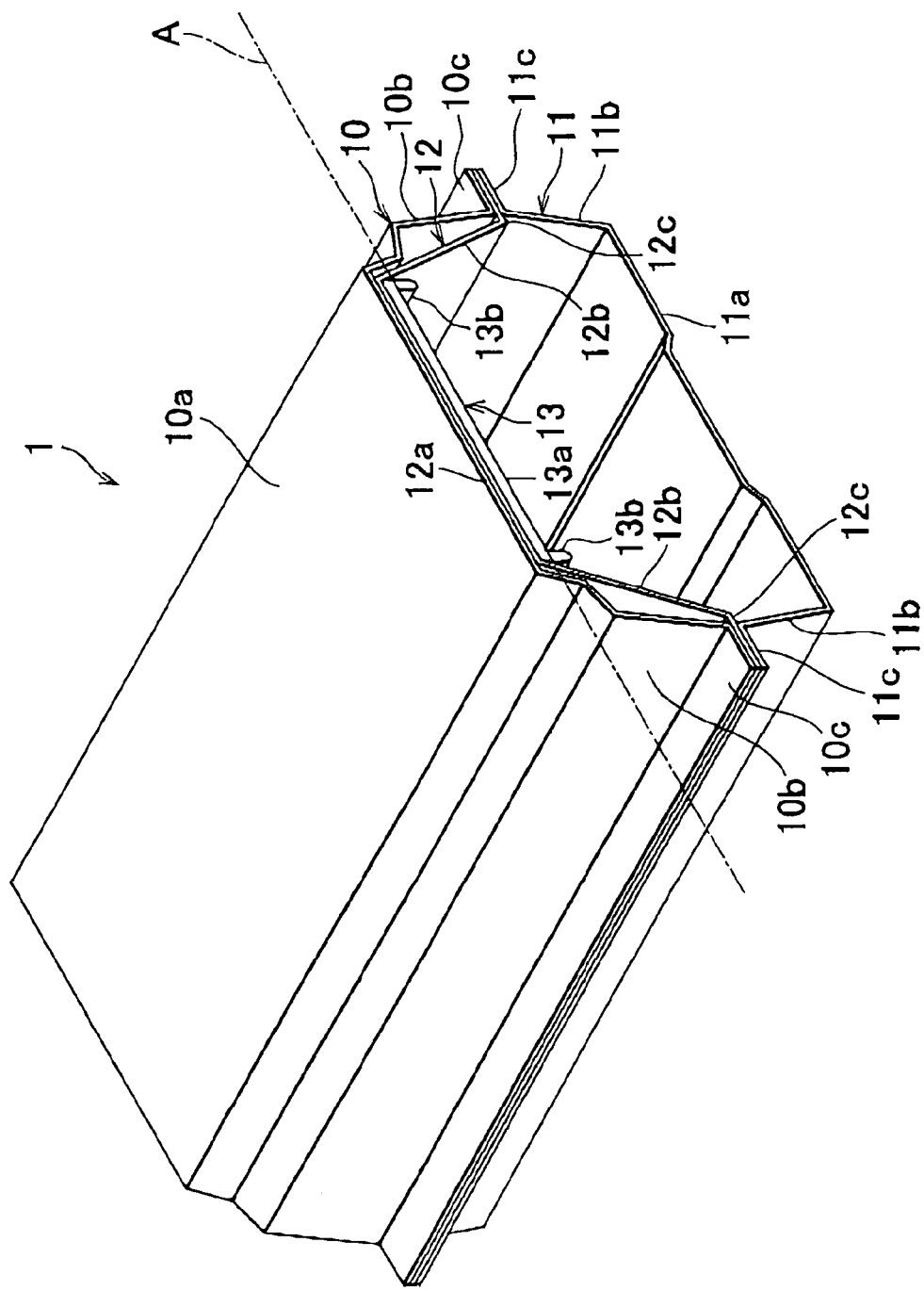
FIG. 1 is a perspective view of a B-pillar in accordance with a first embodiment.
Figure 2:
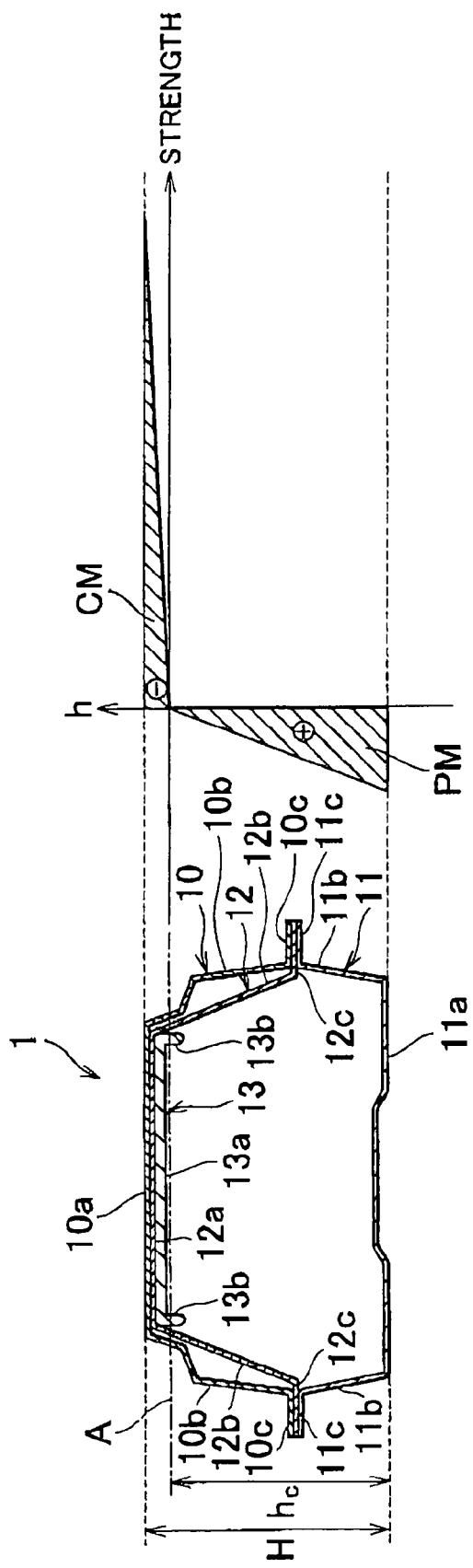
FIG. 2 shows a cross sectional view of the B-pillar of FIG. 1 and a chart showing moments (stresses) produced on the compression side and the tension side of a bend.

With reference to FIGS. 1 and 2, a description will be made of a B-pillar 1 in accordance with the first embodiment FIG. 1 is a perspective view of a B-pillar in accordance with a first embodiment. FIG. 2 shows a cross sectional view of the B-pillar of FIG. 1 and a chart showing moments (stresses) produced on the compression side and the tension side of a bend.

In order to achieve both high strength and lightweight, the B-pillar 1 includes reinforcing members made of a material having high strength and a large sheet thickness. This allows the neutral axis of a bend to be disposed in the vicinity of a compression-side wall (or disposed in the compression-side wall). For that purpose, the B-pillar 1 includes a pillar outer panel 10, a pillar inner panel 11, an outer reinforcement 12, and a hinge reinforcement 13.

The pillar outer panel 10 is to be disposed on the exterior side of a vehicle. The pillar outer panel 10 has a generally recessed shape (as viewed in cross section) having an outer wall 10a which serves as an exterior wall of the B-pillar 1, vertical walls 10b, 10b extending from both ends of the outer wall 10a, and flanges 10c, 10c extending from respective ends of the vertical walls 10b, 10b. The pillar outer panel 10 is formed from an SPC270 material having a sheet thickness of 0.75 mm, for example. The character string "SPC" denotes cold-rolled steel, and the following number indicates the tensile strength. For example, the above example represents a material having a tensile strength of 270 N/mm² or more.

The pillar inner panel 11 is to be disposed on the interior side of a vehicle. The pillar inner panel 11 has a generally recessed shape (as viewed in cross section) having an inner wall 11a which serves as an interior wall of the B-pillar 1, vertical walls 11b, 11b extending from both ends of the inner wall 11a, and flanges 11c, 11c extending from respective ends of the vertical walls 11b, 11b. The pillar inner panel 11 is formed from an SPC590 material having a sheet thickness of 1.6 mm, for example. The pillar outer panel 10 and the pillar inner panel 11 provide a closed cross sectional structure, and define the exterior shape of the B-pillar 1.

The outer reinforcement 12 is one of the reinforcing members for the outer side of the B-pillar 1. The outer reinforcement 12 is disposed on the interior side of the pillar outer panel 10. The outer reinforcement 12 has a generally recessed shape (as viewed in cross section) having an outer wall 12a joined to the outer wall 10a of the pillar outer panel 10, vertical walls 12b, 12b extending from both ends of the outer wall 12a, and flanges 12c, 12c extending from respective ends of the vertical walls 12b, 12b. The outer reinforcement 12 is formed from an SPC980 material having a sheet thickness of 1.6 mm, for example.

The hinge reinforcement 13 is one of the reinforcing members for the outer side of the B-pillar 1. The hinge reinforcement 13 is disposed on the interior side of the outer reinforcement 12. The hinge reinforcement 13 has a generally recessed shape (as viewed in cross section) having an outer wall 13a joined to the outer wall 12a of the outer reinforcement 12, and vertical walls 13b, 13b extending from both ends of the outer wall 13a. The vertical walls 13b, 13b are significantly short, and they have a minimum length that barely provides surface stiffness (twice the sheet thickness or less). The hinge reinforcement 13 is formed by hot-stamping a material having a sheet thickness of 3.2 min, for example.

The outer reinforcement 12 and the hinge reinforcement 13 are reinforcing members disposed on the compression side of a bend, and formed from a material having higher strength and a larger sheet thickness than those of the material of the pillar inner panel 11. In particular, the hinge reinforcement 13 is made from a material having higher strength and a larger sheet thickness than those of the material of the outer reinforcement 12, for example a high-tension material having a material strength (yield strength) of 1500 MPa or more and a maximum realistic sheet thickness (3.2 mm or less). Incidentally, the pillar inner panel 11, which is to be in a tensile stress field, and the vertical walls 10b, 10b Of the pillar outer panel 10 are made from a material having a material strength of 300 MPa or less, for example.

To assemble the B-pillar 1, the outer wall 12a of the outer reinforcement 12 is placed over the outer wall 10a of the pillar outer panel 10, the flanges 12c, 12c of the outer reinforcement 12 are placed over the flanges 10c, 10c of the pillar outer panel 10, and further the outer wall 13a of the hinge reinforcement 13 is placed over the outer wall 12a of the outer reinforcement 12. Then, the outer wall 10a, the outer wall 12a, and the outer wall 13a are joined together by welding or the like. Further, the flanges 11c, 11c of the pillar inner panel 11 are placed over the flanges 10c, 10c of the pillar outer panel 10, and the flanges 10c, 10c and the flanges 11c, 11c are joined by welding or the like.

In the first embodiment, the outer wall 10a of the pillar outer panel 10, the outer wall 12a of the outer reinforcement 12, and the outer wall 13a of the hinge reinforcement 13 can be considered as the "compression-side wall part" of the present invention, the inner wall 11a of the pillar inner panel 11 can be considered as the "tension-side wall part" of the present invention, and the vertical walls 10b, 10b of the pillar outer panel 10 and the vertical walls 11b, 11b of the pillar inner panel 11 can be considered as the "coupling wall part" of the present invention.

According to the cross sectional structure of the thus configured B-pillar 1, the outer wall 10a of the pillar outer panel 10, the outer wall 12a of the outer reinforcement 12, and the outer wall 13a of the hinge reinforcement 13 (in particular, the outer wall 13a of the hinge reinforcement 13), which are to be on the compression side (contraction side) of a bend when the B-pillar 1 receives a load due to a side collision or the like, have much higher strength and a much larger sheet thickness than those of the inner wall 11a of the pillar inner panel 11, which is to be on the tension side (elongation side) of the bend. Therefore, the stiffness (rigidity) of the compression-side wall is much higher than that of the tension-side wall.

FIG. 2 shows a compression-side moment CM (compressive stress) and a tension-side moment PM (tensile stress), with the horizontal axis representing the strength and the vertical axis representing the distance (h) from the neutral axis A. The neutral axis A is at the position where the compression-side moment CM (compressive stress) and the tension-side moment PM (tensile stress) match each other (that is, the area for the moment CM and the area for the moment PM are equal to each other in FIG. 2). The strength (rigidity) is much higher on the compression side than on the tension side. Therefore, the distance from the neutral axis A to the compression-side wall is significantly short, with the neutral axis A of a bend positioned in the vicinity of the outer wall 13a of the hinge reinforcement 13 (or positioned over the outer wall 13a). The distance from the neutral axis A to the compression-side wall can be made shorter as the material strength of the compression-side wall (in particular, the outer wall 13a of the hinge reinforcement 13) is made higher or the sheet thickness thereof is made larger.

Defining the position of the neutral axis A (the distance from the neutral axis A to the inner wall 11a of the pillar inner panel 11) as $h_c$, the position $h_c$ satisfies the expression (1):

$$\int_{-h_c}^{H-h_c} h \times \sigma \times dA = 0 \qquad (1)$$

In the expression (1), H represents the overall height of the B-pillar 1 (the distance from the outer wall 10a of the pillar outer panel 10 to the inner wall 11a of the pillar inner panel 11), h represents the distance from the neutral axis A (a variable), σ represents the material strength, and dA represents a very small area (=sheet thickness×very small height). Since the compression-side wall (in particular, the outer wall 13a of the hinge reinforcement 13) has high material strength and a large sheet thickness, the position $h_c$ of the neutral axis A that satisfies the expression (1) is in the vicinity of the compression-side wall (generally at the same position as the outer wall 13a of the hinge reinforcement 13).

With the neutral axis A positioned in the vicinity of the compression-side wall as described above, the compression-side wall (the outer wall 10a, the outer wall 12a, and the outer wall 13a) of the B-pillar 1 and an extremely small region of the vertical wall part (the vertical walls 10b, 10b and the vertical walls 11b, 11b) are to be in the compressive stress field, and the tension-side wall (the inner wall 11a) of the B-pillar 1 and almost the entire region of the vertical wall part are to be in the tensile stress field. Thus, when the B-pillar 1 is bent by receiving a load, almost no portion of the vertical wall part of the B-pillar 1 is compressed. Therefore, it is possible to eliminate or minimize the possibility that the vertical wall part is elastically buckled by a compressive stress. As a result, a load of up to the potential strength limit of the material can be endured. In addition, since almost no portion of the vertical wall part is in the compressive stress field, no reinforcing member is needed for the vertical wall part. Therefore, the vertical walls 13b, 13b of the hinge reinforcement 13 can be significantly shortened, and there is no need for a reinforcement 105, which is provided in the B-pillar 100 shown in FIG. 5. Thus, the weight and hence the cost can be reduced for such a reinforcing member.

By configuring the compression-side wall (in particular, the outer wall 13a of the hinge reinforcement 13) itself of the B-pillar 1 to have high strength and a large sheet thickness, the stiffness (rigidity) of the compression-side wall can be improved so that the elastic buckling limit increases to surpass the plastic buckling strength. Therefore, when the B-pillar 1 is bent by receiving a load, the entirety of the compression-side wall is plastically buckled, rather than locally elastically bucked. As a result, the potential strength of the material can be fully demonstrated, thereby increasing the buckling strength.

Figure 5:
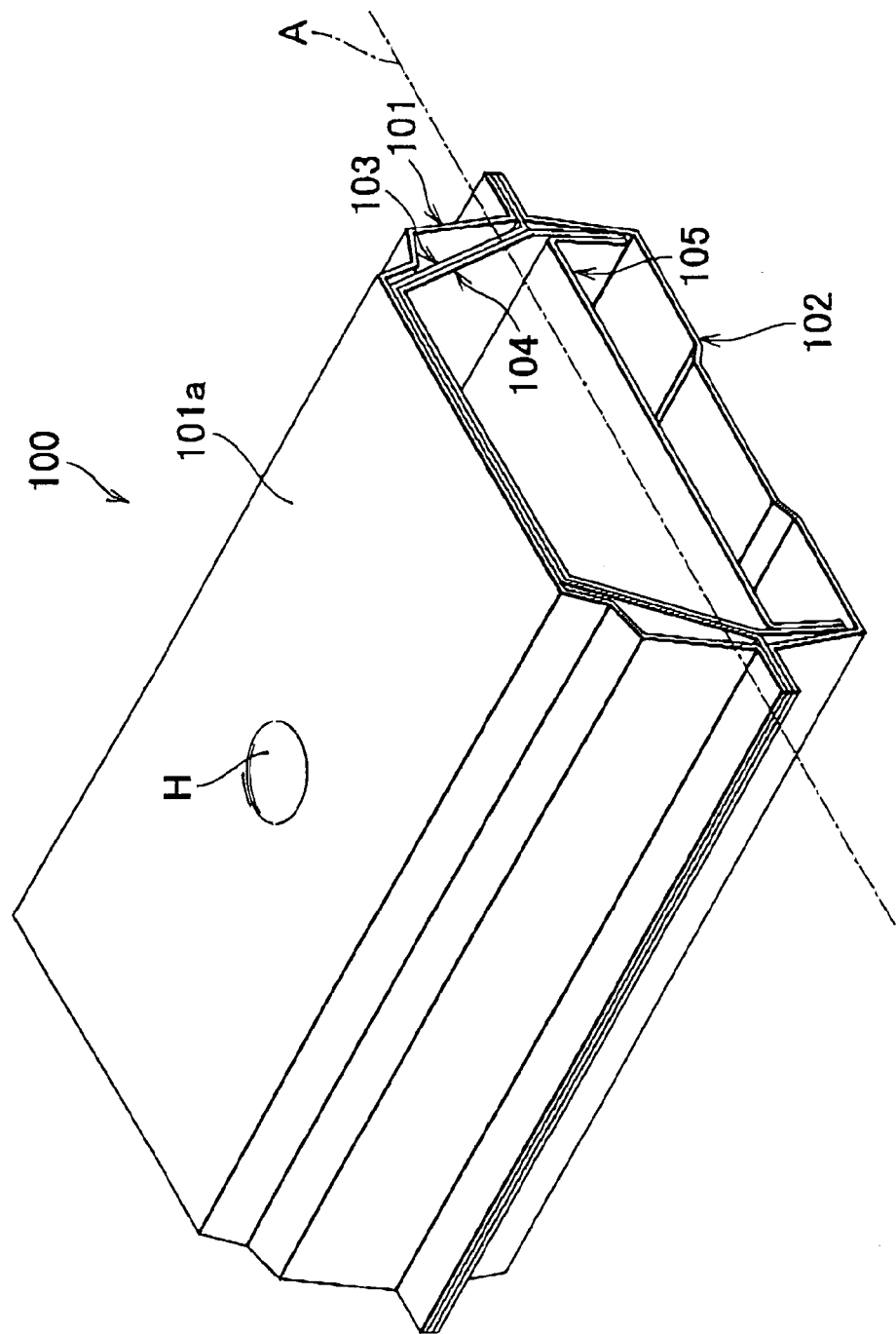
FIG. 5 is a perspective view of a conventional B-pillar.
Figure 6:
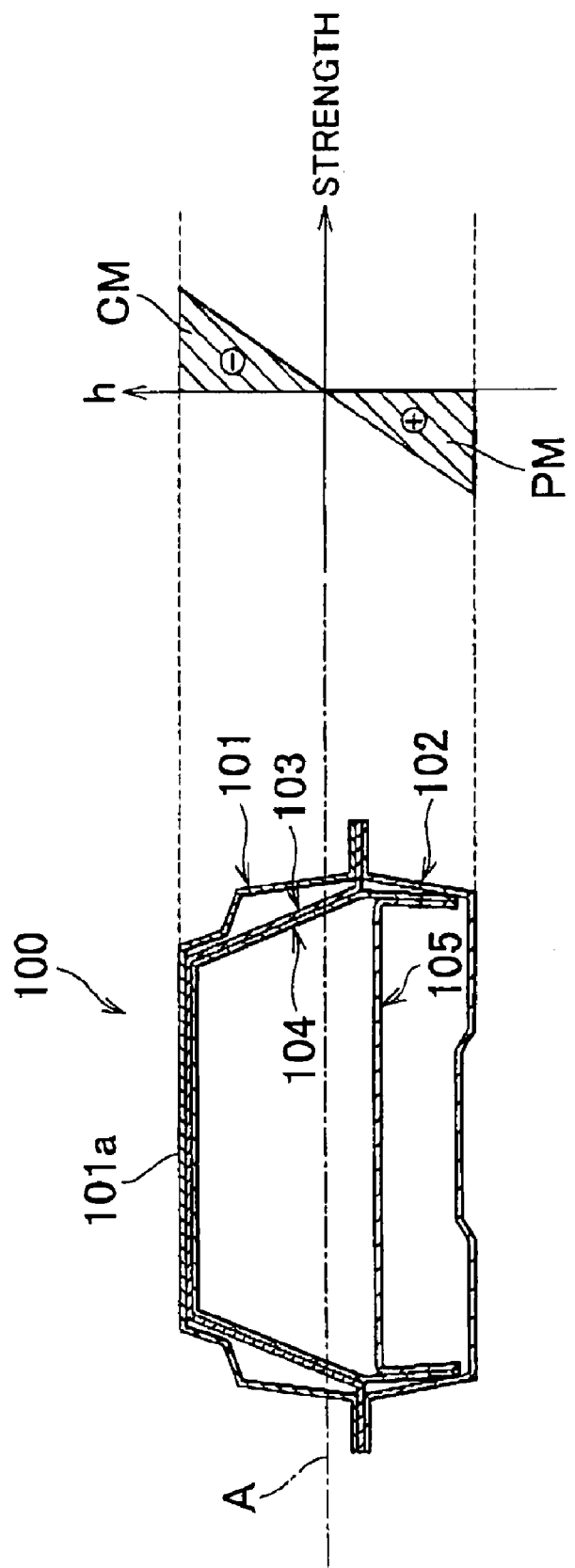
FIG. 6 shows a cross sectional view of the B-pillar of FIG. 5 and a chart showing moments (stresses) produced on the compression side and the tension side of a bend.

Incidentally, in the B-pillar 100 shown in FIG. 5, the strength and the sheet thickness of the wall on the compression side of a bend are not much greater than those of the tension-side wall. Therefore, as shown in FIG. 6, the distance from the neutral axis A of a bend to the compression-side wall is not so short, with the neutral axis A positioned in the vicinity of the center of the cross section of the B-pillar 100. Thus, roughly half the vertical wall part of the B-pillar 100 is to be in the compressive stress field. As a result, when the B-pillar 100 is bent by receiving a load, there is a possibility that the compression-side wall is locally elastically buckled. Further, according to this configuration, since the load to be carried on the tension side is small, the potential strength of the material cannot be fully demonstrated on the tension side. As a result, a stress is not increased to the upper limit of the material strength over the entire cross section of the B-pillar 100.

According to the structure of the B-pillar 1, by configuring the compression-side wall (in particular, the outer wall 13a of the hinge reinforcement 13) to have high strength and a large sheet thickness, the neutral axis A of a bend can be disposed in the vicinity of the compression-side wall, thereby achieving a high-strength and lightweight (low-cost) structure. According to the structure of the B-pillar 1, in particular, by configuring the compression-side wall itself to have high strength and a large sheet thickness, the buckling strength of the compression-side wall can be increased, thereby preventing the occurrence of elastic buckling. Further, according to the structure of the B-pillar 1, a stress of up to the potential strength limit of the material can be produced over the entire cross section of the compression-side wall of the B-pillar 1, which is significantly efficient.

Figure 3:
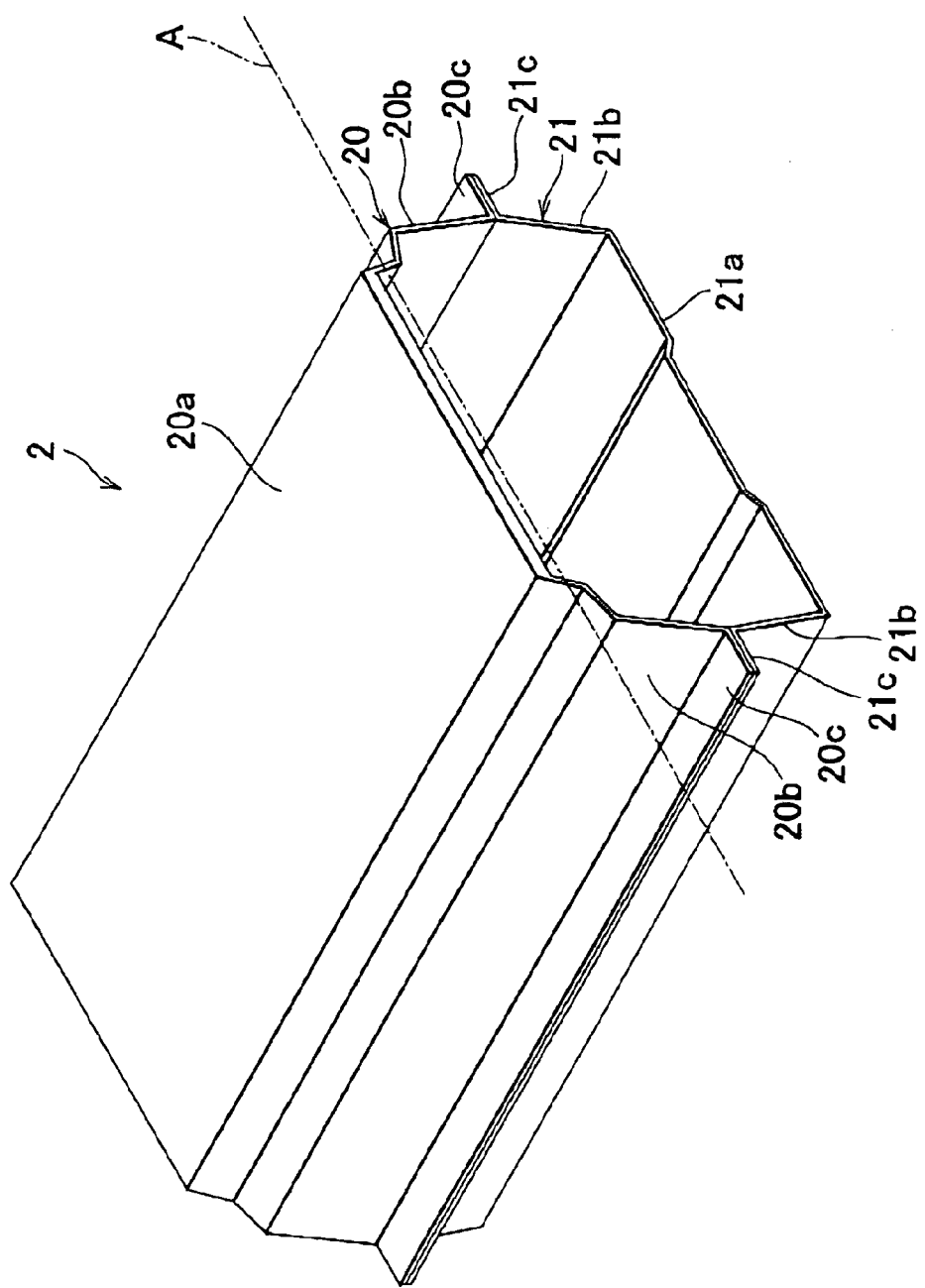
FIG. 3 is a perspective view of a B-pillar in accordance with a second embodiment.
Figure 4:
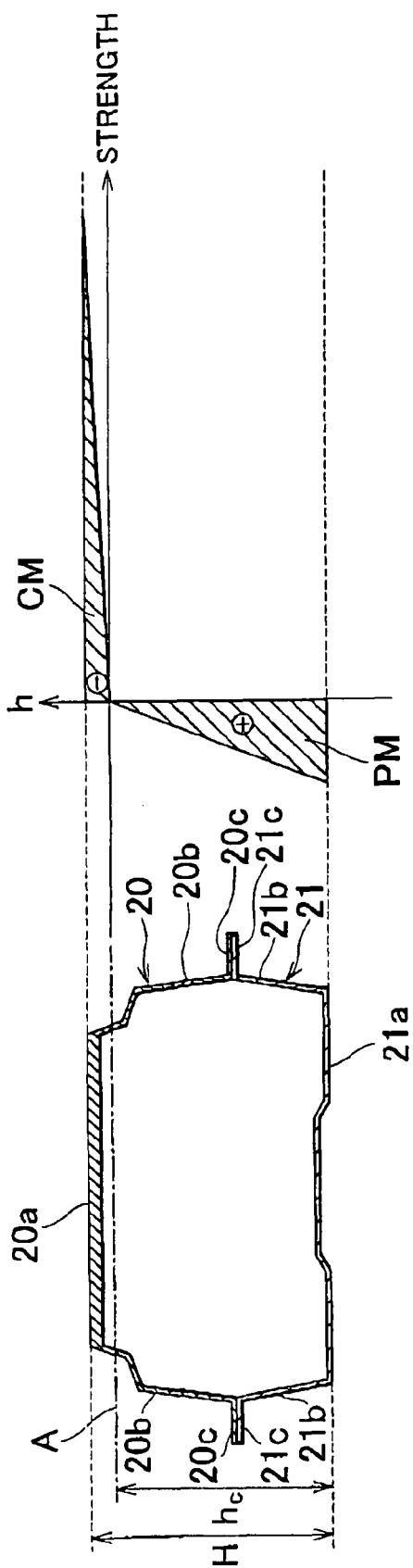
FIG. 4 shows a cross sectional view of the B-pillar of FIG. 3 and a chart showing moments (stresses) produced on the compression side and the tension side of a bend.

With reference to FIGS. 3 and 4, a description will be made of a B-pillar 2 in accordance with the second embodiment. FIG. 3 is a perspective view of a B-pillar in accordance with a second embodiment. FIG. 4 shows a cross sectional view of the B-pillar of FIG. 3 and a chart showing moments (stresses) produced on the compression side and the tension side of a bend.

In order to achieve both high strength and lightness, an outer wall of a pillar outer panel of the B-pillar 2 is made of a material having high strength and a large sheet thickness. This allows the neutral axis of a bend to be disposed in the vicinity of a compression-side wall. For that purpose, the B-pillar 2 includes a pillar outer panel 20 and a pillar inner panel 21. Since the pillar inner panel 21 is the same as the pillar inner panel 11 in accordance with the first embodiment, a description thereof is omitted.

Similar to the pillar outer panel 10 in accordance with the first embodiment, the pillar outer panel 20 is to be disposed on the exterior side of a vehicle, and has a generally recessed shape (as viewed in cross section) having an outer wall 20a, vertical walls 20b, 20b, and flanges 20c, 20c. Materials of the pillar outer panel 20 other than the outer wall 20a, namely the vertical walls 20b, 20b and flanges 20c, 20c, have the same strength and sheet thickness as those of the corresponding materials of the pillar outer panel 10 in accordance with the first embodiment.

The outer wall 20a of the pillar outer panel 20, which serves as a reinforcing portion for the cross section on the compression side of a bend, is made of a material having higher strength and a larger sheet thickness than those of the material of the pillar inner panel 21. The outer wall 20a is made from a material having a material strength of 1500 MPa or more and a maximum realistic sheet thickness, for example. Incidentally, the pillar inner panel 21, which is to be in a tensile stress field, and the vertical walls 20b, 20b of the pillar outer panel 20 are made from a material having a material strength of 300 MPa or less, for example. The pillar outer panel 20, which has different material strengths and sheet thicknesses depending on locations as described above, is formed by Tailor Welded Blank (continuous laser welding) or the like.

To assemble the B-pillar 2, the flanges 21c, 21c of the pillar inner panel 21 are placed over the flanges 20c, 20c of the pillar outer panel 20, and the flanges 20c, 20c and the flanges 21c, 21c are joined by welding or the like.

In the second embodiment, the outer wall 20a of the pillar outer panel 20 can be considered as the "compression-side wall part" of the present invention, the inner wall 21a of the pillar inner panel 21 can be considered as the "tension-side wall part" of the present invention, and the vertical walls 20b, 20b of the pillar outer panel 20 and the vertical walls 21b, 21b of the pillar inner panel 21 can be considered as the "coupling wall part" of the present invention.

According to the structure of the thus configured B-pillar 2, the outer wall 20a of the pillar outer panel 20, which is to be on the compression side of a bend when the B-pillar 2 receives a load due to a side collision or the like, has much higher strength and a much larger sheet thickness than those of the inner wall 21a of the pillar inner panel 21, which is to be on the tension side of the bend. Therefore, the stiffness (rigidity) is much higher on the compression side than on the tension side. Thus, as with the B-pillar 1 in accordance with the first embodiment, the distance from the neutral axis A of a bend to the compression-side wall is significantly short, with the neutral axis A positioned in the vicinity of the outer wall 20a of the pillar outer panel 20 (or positioned over the outer wall 20a). The distance from the neutral axis A to the compression-side wall can be made shorter as the material strength of the compression-side wall (the outer wall 20a) is made higher or the sheet thickness thereof is made larger.

The thus structured B-pillar 2, in which the neutral axis A is positioned in the vicinity of the compression-side wall and the compression-side wall itself has high strength and a larger sheet thickness, has the same effects as those of the B-pillar 1 in accordance with the first embodiment.

In addition to having the same effects as those of the B-pillar 1 in accordance with the first embodiment, the B-pillar 2 also has the following effect. According to the structure of the B-pillar 2, the outer wall 20a of the pillar outer panel 20 has high strength and a large sheet thickness, which eliminates the need for a reinforcing member such as an outer reinforcement or a hinge reinforcement. As a result, further weight reduction can be achieved and the time necessary for assembly can be reduced, thereby further reducing the cost.

Embodiments of the present invention have been described above. The present invention is not limited to the above embodiments, and may be modified in various ways.

For example, although the present invention is applied to a B-pillar of a vehicle in the embodiments, the present invention may be applied to other framework members (structural members) for vehicles such as a side member, or to structural members for non-vehicles. For example, the present invention may be applied to pillars other than a B-pillar. It is only necessary to increase the stiffness (rigidity) of a member (wall) on the side where reception of an impact is expected. For example, such a member (wall) with increased stiffness may be used on the exterior side of a vehicle.

In addition, although both the material strength and the sheet thickness of the compression-side wall are made greater than those of the tension-side wall in the embodiments, only either the material strength or the sheet thickness of the compression-side wall may be made greater as long as the compression-side wall can secure sufficient strength.

Further, although an outer reinforcement is provided in the first embodiment, an outer reinforcement may be not provided as long as the compression-side wall can secure sufficient strength.

In the first embodiment of the invention, the sum of the thickness of the outer wall 10a, the thickness of the outer wall 12a and the thickness of the outer wall 13a is larger than each of the thickness of the vertical wall 11b and the sum of thickness of the vertical wall 10b and the thickness of the vertical wall 12b. Further, the sum of the strength of the outer wall 10a, the strength of the outer wall 12a and the strength of the outer wall 13a is higher than each of the strength of the vertical wall 11b and the sum of the strength of the vertical wall 10b and the strength of the vertical wall 12b. In the second embodiment of the invention, the outer wall 20a is in thickness and higher in strength than each of the vertical wall 20b and the vertical wall 21b.

The invention claimed is:

1. A structural member comprising:
an outer panel having a first wall part; and
an inner panel having a second wall part,
wherein the outer panel and the inner panel form a closed cross-sectional structure, and
wherein a thickness of the first wall part is larger than a thickness of the second wall part,
wherein a neutral axis of a bend, at which compressive stress and tensile stress match each other, is positioned over the first wall part, and
wherein a distance hc from the neutral axis to the second wall part satisfies the following expression:

$$\int_{-h_c}^{H-h_c} h \times \sigma \times dA = 0$$

wherein, H represents a distance from the first wall part to the second wall part, h is a variable representing the distance from the neutral axis to the second wall part, σ represents the material strength, and A represents area.

2. The structural member according to claim 1, wherein the outer panel includes a third wall part and the inner panel includes a fourth wall part; the third wall part couples the first wall part and the fourth wall part; and the fourth wall part couples the second wall part and the third wall part.

* * * * *

UNITED STATES PATENT AND TRADEMARK OFFICE
CERTIFICATE OF CORRECTION

| | | |
|---|---|---|
| PATENT NO. | : | 8,393,672 B2 |
| APPLICATION NO. | : | 12/598553 |
| DATED | : | March 12, 2013 |
| INVENTOR(S) | : | Takeo Mori |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

First Day of September, 2015

Michelle K. Lee
*Director of the United States Patent and Trademark Office*